US008156119B2

(12) United States Patent
Hu et al.

(10) Patent No.: US 8,156,119 B2
(45) Date of Patent: Apr. 10, 2012

(54) SMART ATTRIBUTE CLASSIFICATION (SAC) FOR ONLINE REVIEWS

(75) Inventors: Jian Hu, Beijing (CN); Jian-Tao Sun, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 547 days.

(21) Appl. No.: 12/355,987

(22) Filed: Jan. 19, 2009

(65) Prior Publication Data

US 2010/0185569 A1  Jul. 22, 2010

(51) Int. Cl.
*G06F 7/00* (2006.01)
*G06F 17/30* (2006.01)

(52) U.S. Cl. .................................. 707/736; 707/802

(58) Field of Classification Search .................. None
See application file for complete search history.

(56) References Cited

U.S. PATENT DOCUMENTS

| | | | |
|---|---|---|---|
| 7,342,582 | B2 | 3/2008 | Chickering et al. |
| 7,840,408 | B2 * | 11/2010 | Yi et al. ................. 704/258 |
| 7,937,265 | B1 * | 5/2011 | Pasca et al. ............... 704/9 |
| 2008/0249762 | A1 * | 10/2008 | Wang et al. ............... 704/9 |
| 2008/0249764 | A1 * | 10/2008 | Huang et al. .............. 704/9 |
| 2009/0157409 | A1 * | 6/2009 | Lifu et al. ............... 704/260 |

OTHER PUBLICATIONS

Lee et al., "Automatic Construction of Conjoint Attributes and Levels from Online Customer Reviews", retrived on Nov. 19, 2008 at <<http://pbox.wharton.upenn.edu/documents/mktg/research/ConjointAttributes.pdf>>, University of Pennsylvania, The Wharton School.

Ghose, et al, "Designing Novel Review Ranking Systems: Predicting the Usefulness and Impact of Reviews", retirved on Nov. 19, 2008 at <<http://pages.stern.nyu.edu/~panos/publications/icec2007.pdf>>, Department of Information, Operations and Management Sciences Leonard N. Stern School of Business.

Wang, et al., "Feature-based Customer Review Mining" retrieved on Nov. 19, 2008 at <<http://nlp.stanford.edu/courses/cs224n/2007/fp/johnnyw-hengren.pdf>>, Department of Computer Science Stanford University, pp. 1-pp. 9.

Bergsma et al, "Machine Learning Approaches to Sentiment Classification", retirved on Nov. 19, 2008 at <<http://ccc.inaoep.mx/~villasen/index_archivos/cursoTL/articulos/C551_sw5_project.pdf>>, Department of Computer Science University of Alberta, pp. 1-pp. 335.

(Continued)

*Primary Examiner* — Kuen Lu
*Assistant Examiner* — Tuan A Pham
(74) *Attorney, Agent, or Firm* — Lee & Hayes, PLLC

(57) ABSTRACT

Techniques for identifying attributes in a sentence and determining a number of attributes to be associated with the sentence are described. The techniques employ an offline training portion, an online prediction portion, and an attribute identification algorithm. The offline training portion utilizes relationships between attributes within sentences input to the offline training portion to improve attribute identification of the attribute identification algorithm. The online prediction portion predicts, for each sentence input, the attributes of the sentence, and the number of attributes the sentence is associated with by employing the attribute identification algorithm.

7 Claims, 5 Drawing Sheets

OTHER PUBLICATIONS

Hu, et al. "Mining and Summarizing Customer Reviews", retirved on Nov. 19, 2008 at <<http://www.cs.uic.edu/~liub/publications/kdd04-revSummary.pdf>>, Department of Computer Science Univeristy of Illinois at Chicago.

Pang, et al., "Opinion Mining and Sentiment Analysis" retirved on Nov. 19, 2008 at <<http://www.cs.cornell.edu/home/llee/omsa/omsa-published.pdf>>, Foundation and Trends in Information Retrival vol. 2 Nos. 1-2 (2008), pp. 1-pp. 135.

Talwar, et al. "Understanding User Behavior in Online Feedback Reporting" retrived on Nov. 19, 2008 at <<http://64.233.183.132/search?q=cache:MI8qU6TrYncJ:www.cs.ubc.ca/~baharak/gtdt/papers/Faltings2%2520-%2520Talwar2007.pdf+%22online+review%22+classify+attributes+product+svm&hl=en&ct=clnk&cd=4>>, pp. 134-pp. 142.

* cited by examiner

SMART ATTRIBUTE CLASSIFICATION (SAC) FOR ONLINE REVIEWS

BACKGROUND

With the rapid expansion of electronic commerce (e-commerce) via the Internet, more and more products are sold to consumers on the Web. As a result, there is an increasing number of people writing reviews that are published on the Web to express their opinions on the products that they have purchased. As a result, the number of reviews that a product receives grows rapidly. Some popular products can get thousands of reviews at some large merchant sites. This may lead to difficulty for a potential customer to read the product reviews and then make an informed decision on whether to purchase the product. Further, the growing number of product reviews on the Web makes it hard for product manufacturers to keep track of customer opinions of their respective products.

To that end, text classifications of customer reviews of products sold online may be done to generate attribute-based summaries of the customer reviews. Text classification may be categorized into two groups: single labeled and multi-labeled. Single-labeled text classification assumes each customer review (or any text block) belongs to one of two pre-specified labels. Multi-labeled text classification allows each customer review (or any text block) to belong to more than one label.

For single-labeled text classification, the selection strategy of the label for the customer review (or any text block) follows the assumption that the customer review (or any text block) has only one label. When uncertainty selection strategy is employed, if the classification scores of the labels are ranked and the two largest scores are close, the classifier is uncertain about the label to apply to the customer review (or any text block).

In multi-label text classification, the customer review (or any text block) may have more than one label. The uncertainty measure should consider the number of labels that may apply to the customer review (or any text block), rather than regarding each customer review (or any text block) belonging to only one label. As a result, methods used for single-label text classification may not be applied to multi-label text classification tasks.

Therefore, there remains a need for a multi-label algorithm to identify attributes of customer reviews (or any text block).

SUMMARY

This summary is provided to introduce concepts relating to remote auto provisioning and publication of applications. These concepts are further described below in the detailed description. The presented summary is not intended to identify essential features of the claimed subject matter, nor is it intended for use in determining the scope of the claimed subject matter.

An attribute identification (AI) framework is described. The AI framework comprises an offline training portion, an online prediction portion, and an AI algorithm module. The offline training portion utilizes the relationships between attributes within sentences input to the offline training portion to improve attribute identification of the AI algorithm module. The online prediction portion predicts, for each sentence input, the attributes of the sentence and the number of attributes the sentence is associated with by employing the AI algorithm module.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
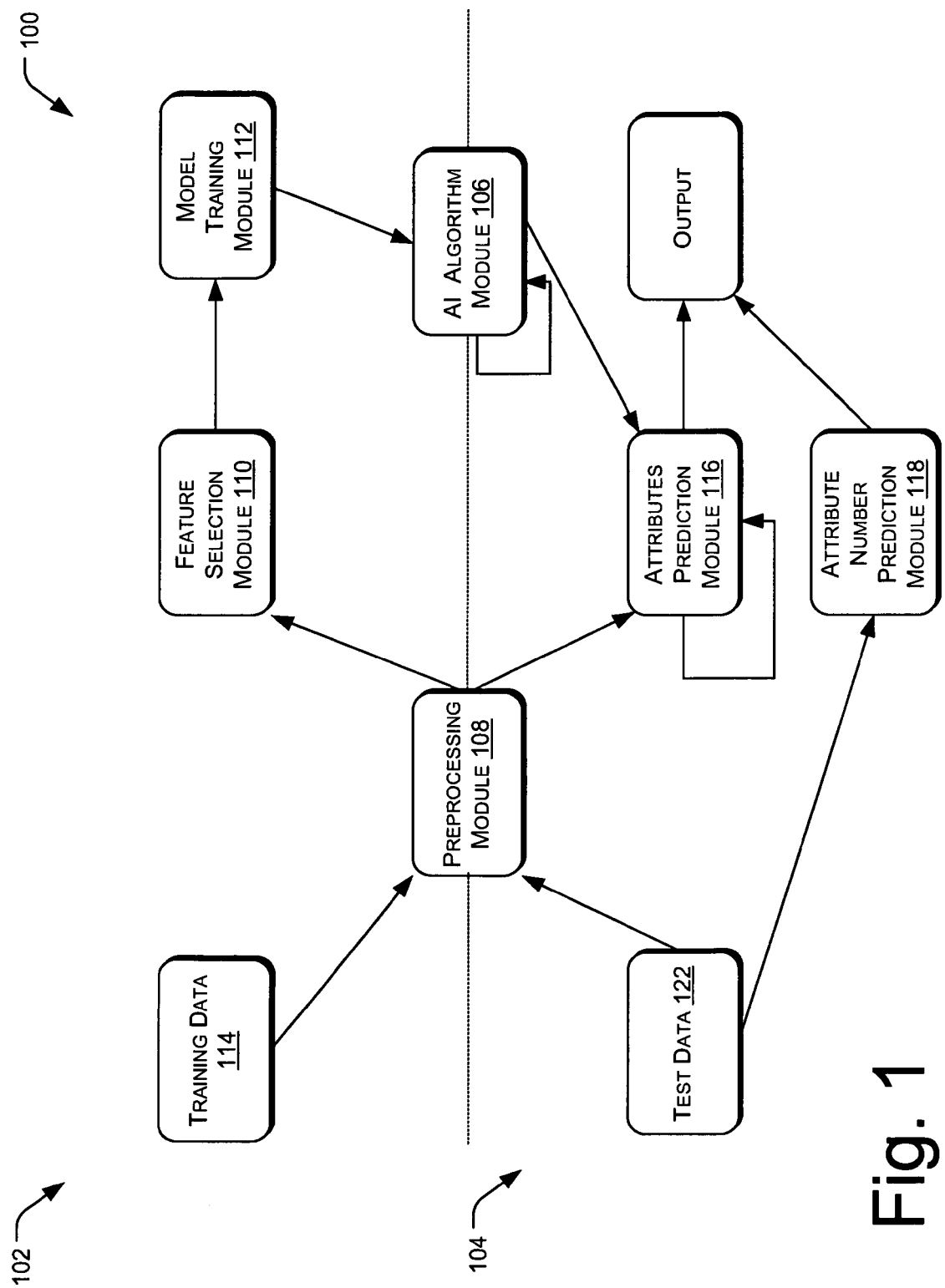
FIG. 1 is a block diagram illustrating the attribute identification (AI) framework.

FIG. 1 shows a block diagram of an attribute identification (AI) framework 100. AI framework 100 comprises three portions: 1) an offline training portion 102; 2) an online prediction portion 104; and 3) an AI algorithm module 106. An output of offline training portion 102 is input to AI algorithm module 106 and an output of AI algorithm module 106 is input to online prediction portion 104. Offline training portion 102 generates AI algorithm module 106 such that online prediction portion 104 may utilize AI algorithm module 106 to identify attributes of a grouping of sentences and predict the number of attributes associated with the grouping of sentences.

The grouping of sentences may be any text block including, but not limited to, customer reviews of products (including online customer reviews), documents, customer feedback, forum threads, and weblogs that contains user opinions.

Offline Training Portion 102

Offline training portion 102 comprises a preprocessing module 108, a feature selection module 110, and a model training module 112. Offline training portion 102 has input thereto training data 114 (i.e. a grouping of sentences, a customer review, or any text as mentioned above), with each sentence extracted from training data 114 having at least one defined attribute associated therewith that is assigned by human labelers. The output of offline training portion 102 is the output of model training module 112 that is input to AI algorithm module 106.

Figure 2:
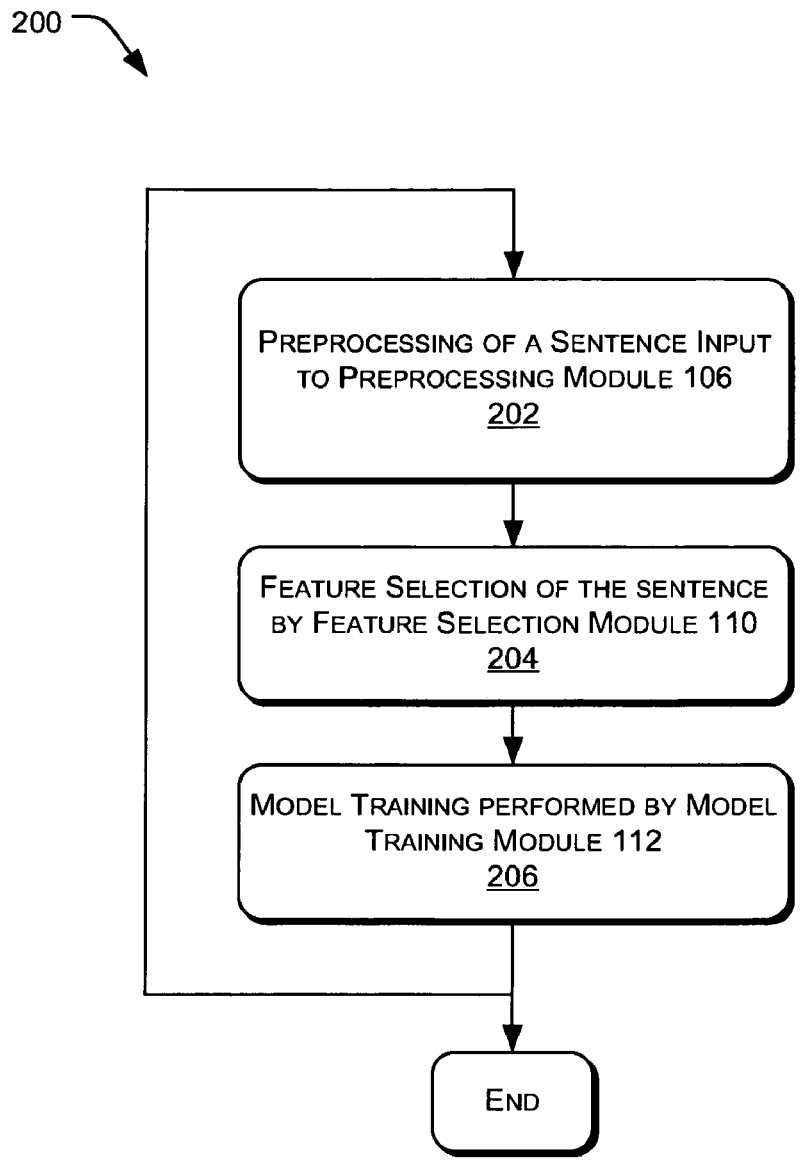
FIG. 2 is a flowchart illustrating a process of an offline training portion of the AI framework of FIG. 1.

FIG. 2 shows an overview of a process 200 of employing offline training portion 102 to generate AI algorithm module 106. At step 202, a preprocessing of training data 114 input to preprocessing module 108 is performed. At step 204, feature selection of each sentence of training data 114 is performed by feature selection module 110. At step 206, model training is performed by model training module 112 based upon training data 114. Process 200 is repeated until all sentences from training data 114 are input to offline training portion 102. Process 200 is described more fully below.

Preprocessing Step 202

At step 202 of FIG. 2, each sentence of training data 114 is fed as an input to preprocessing module 108. Preprocessing module 108 first tokenizes each sentence into ngrams (in an example, the length of ngrams$\leq 3$) and then filters the ngrams which are the stopwords in the stopwords list collected, denoted as tokenized sentences.

Feature Selection Step 204

At step 204 of FIG. 2, information gain (IG) is employed as the feature selection method of feature selection module 110. IG is employed in the field of machine learning as feature-goodness criterion. IG measures a number of bits of information obtained for category prediction by knowing a presence or absence of an ngram feature in each tokenized sentence of training data 114. To that end, the IG of term t may be defined as follows:

$$G(t)=-\Sigma_{i=1}^{m}P_r(c_i)\log P_r(c_i)+P_r(t)\Sigma_{i=1}^{m}P_r(c_i|t)\log P_r(c_i|t)+P_r(\bar{t})\Sigma_{i=1}^{m}P_r(c_i|\bar{t})\log P_r(c_i|\bar{t}) \quad (1)$$

wherein $c_i$ denotes the category of the attribute in the sentence in the target space, and m is the number of attribute categories.

Model Training Step 206

At step 206 of FIG. 2, a support vector machine (SVM) based classification model is employed to generate AI algorithm module 106 by model training module 112. To that end, each sentence of training data 114 may have more than one attribute associated therewith. As a result, a binary classifier of the AI algorithm module 106 is trained for each defined attribute of the sentence. However, employing the binary classifier may assume that each attribute of the sentence is conditionally independent from one another. Thus, a relationship between the attributes of the sentence may be ignored, which is undesirable. To utilize the dependency of the attributes of the sentence, if attribute categories $c_i$ and $c_j$ are related, i.e. classifying the sentence as having an attribute of category $c_i$ is a good indicator of classification of the sentence as having an attribute of class $c_j$. AI algorithm module 106 first classifies each sentence of training data 114 by employing the binary SVM classifier to obtain a vector of probability scores. Then a way to enhance the SVM is to augment the original ngram based feature set with the attribute categories probability score vector as extra features, one for each sentence of training data 114. Based on the new feature set, the binary classifier of AI algorithm module 106 is trained for each defined attribute category. The cyclic dependency between attributes of the sentences of training data 114 is resolved iteratively.

Figure 3:
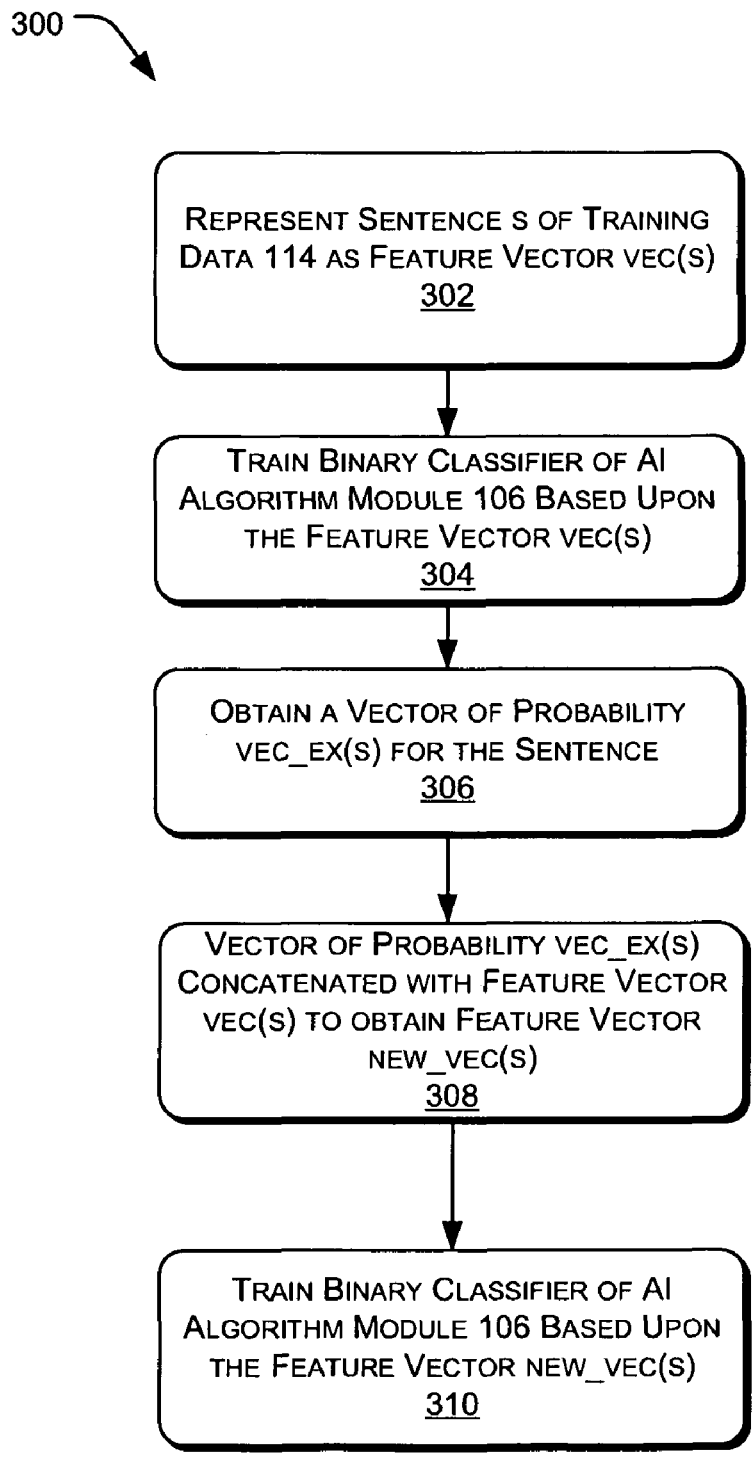
FIG. 3 is a flowchart illustrating a process of employing a model training module of the offline training portion of FIG. 2

FIG. 3 shows a process 300 of the model training steps, as shown above in step 206 of FIG. 2. At step 302, each sentence s of training data 114 is represented as a feature vector, denoted as vec(s), with ||vec(s)||=1. At step 304, based upon the features vector vec(s) of the sentence of training data 114, the binary classifier of the AI algorithm module 106 is trained with the SVM based classification model using a one-against-all mechanism. At step 308, each sentence of training data 114 is classified with the binary classifier of AI algorithm module 106 to obtain a vector of probability score, denoted as vec_ex(s), which stores the probability of the sentence belonging to each attribute category. At step 308, the vector of probability vec_ex(s) is concatenated with the feature vector vec(s) to define feature vector new_vec(s), with feature vector new_vec(s) being normalized to such that ||new_vec(s)||=1. At step 310, based upon new_vec(s), a new classifier of AI algorithm module 106 is trained with the SVM based classification model using the one-against-all mechanism.

Referring back to FIG. 2, if there are no further sentences from training data 114 to input to offline training portion 102, the process ends. If there are further sentences, the process returns to step 202.

Online Prediction Portion 104

Online prediction portion 104 comprises the preprocessing module 108, attributes prediction module 116, and attribute number prediction module 118. Online prediction portion 104 has input thereto test data 122 (i.e. a grouping of sentences, a customer review, or any text as mentioned above). The output of online prediction portion 104 is the attributes predicted by AI algorithm module 106 of the sentence input to online prediction portion 104 and the number of attributes to be associated with the sentence.

Figure 4:
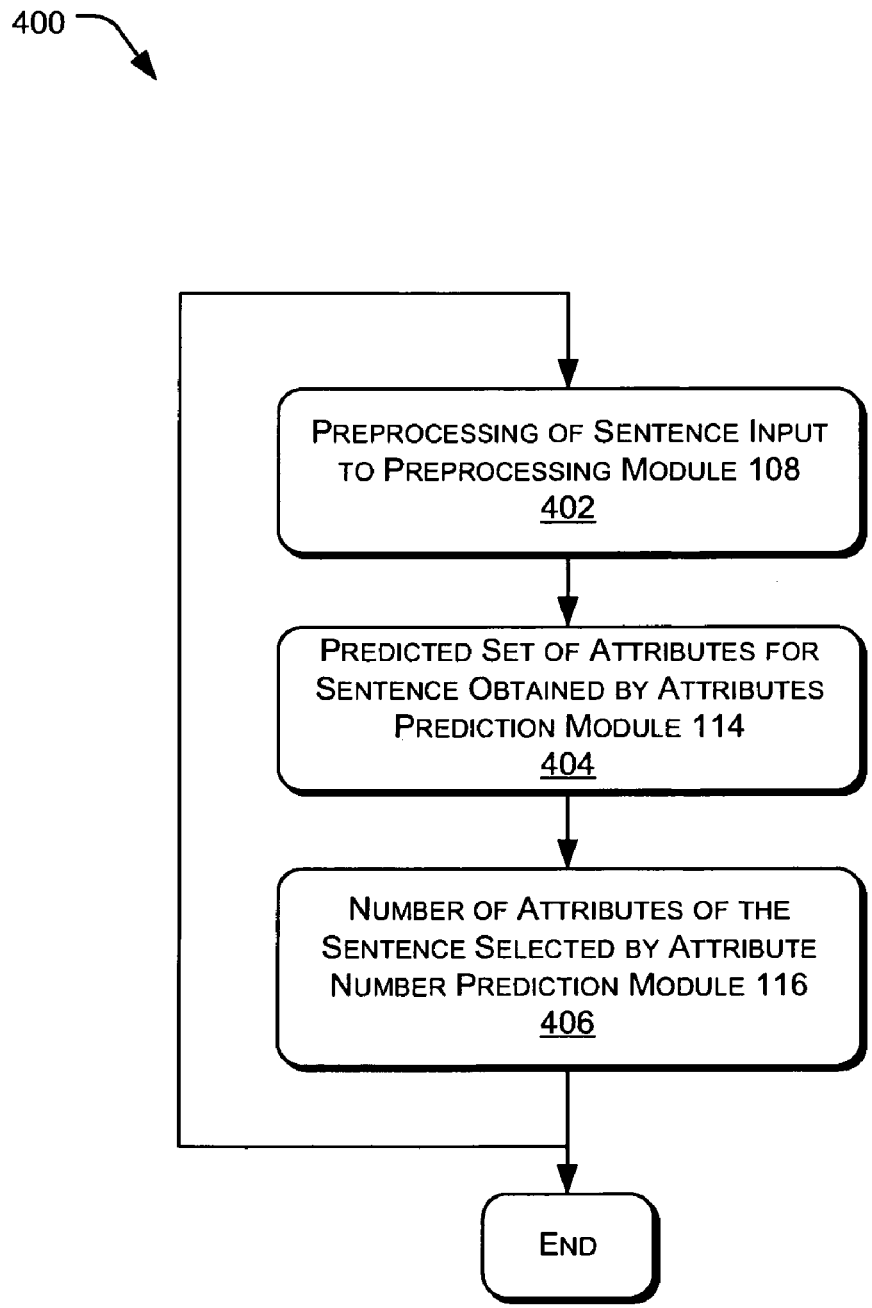
FIG. 4 is a flowchart illustrating a process of an online prediction portion of the AI framework of FIG. 1

FIG. 4 shows an overview of a process 400 of employing online prediction portion 104 to predict the number of attributes and the attributes of each sentence of test data 122. At step 402, a preprocessing of test data 122 input to preprocessing module 108 is performed. At step 404, a predicted set of attributes for each sentence of test data 122 is obtained by attributes prediction module 114. At step 406, a number of attributes to be associated with each sentence of test data 122 is selected by the attribute number prediction module 116. Process 400 is repeated until all sentences from test data 122 are input to online training portion 102. Process 400 is described more fully below.

Preprocessing Step 402

At step 402 of FIG. 4, analogous to step 202 of FIG. 2, each sentence of test data 122 is fed as an input to preprocessing module 108. Preprocessing module 108 first tokenizes each sentence into ngrams (in an example, the ngrams ≦3) and then filters the ngrams which are the stopwords in the stopwords list collected.

Attributes Prediction Step 404

At step 404 of FIG. 4, after transforming the tokenized ngram sentences into model features as recited in the model training step 206 of the offline training portion 102, the tokenized ngram sentences input to the online prediction portion 104 are classified by the attribute prediction module 116 employing the binary classifier of the AI algorithm module 106. For each of the sentences of test data 122, the |C| transformed scores which are the probabilities of all the attribute categories for the input sentence classified by the binary classifier are concatenated to the original features of the input sentence with appropriate scaling, forming the new features set of the training sentence. The generated new features are submitted to the classifier module 106 to obtain the predicted set of attributes of the sentence.

Attribute Number Prediction Step 406

At step 406 of FIG. 4, after obtaining the predicted set of attributes, as recited above in the attributes prediction step 404, the number of attributes that is determined to be associated with the tokenized sentence is determined by attribute number prediction module 118. To that end, for each class $y_i$, the posterior probability $p(y_i|x)$ may be determined dependent upon the value of the decision function $f_i$. The sigmoid function used to determine the posterior probability is defined as:

$$p(y=1|f_i)=1/1+\exp(Af_i(x)+B) \quad (2)$$

wherein $f_i(x)$ is the output of the decision function $f_i$ and A and B are scalar values fitted by maximum likelihood estimation. As a result, for each sentence of test data 122, there are k posterior probabilities for each attribute of the sentence.

In an example, each sentence may have j attributes associated therewith, with the j attributes being sorted in decreased order of probability. To that end, if the j attributes sorted by probability break the tie between the $j^{th}$ and $j+1^{th}$ probability, the classification confidence for the first j attributes may be relatively larger than those attributes after the first j attributes Logistic regression, which is a widely employed classifier used to "learn the break tie." More specifically, for each sentence of test data 122, logistic regression may predict the attribute number of the sentence based upon the input posterior probabilities associated therewith.

Further, the classifier based on logistic regression will be trained. The input training features are the classified probability vector of the input training sentences generated based on the AI algorithm module 106, and the corresponding label for each training sentence is the attributes number associated with the input sentence.

Based on the trained classifier, the number of attributes to be associated with each sentence of test data 122 is determined by the equation:

$$j = arg_k \max p(y=i|x) \quad (3)$$

To that end, for each sentence of test data 122, the attribute categories corresponding to the first j probabilities will be the predicted attributes of the sentence.

If there are no further sentences from test data 122 to input to online prediction portion 104, the process ends. If there are further sentences, the process returns to step 302.

An Exemplary Computer Environment

Figure 5:
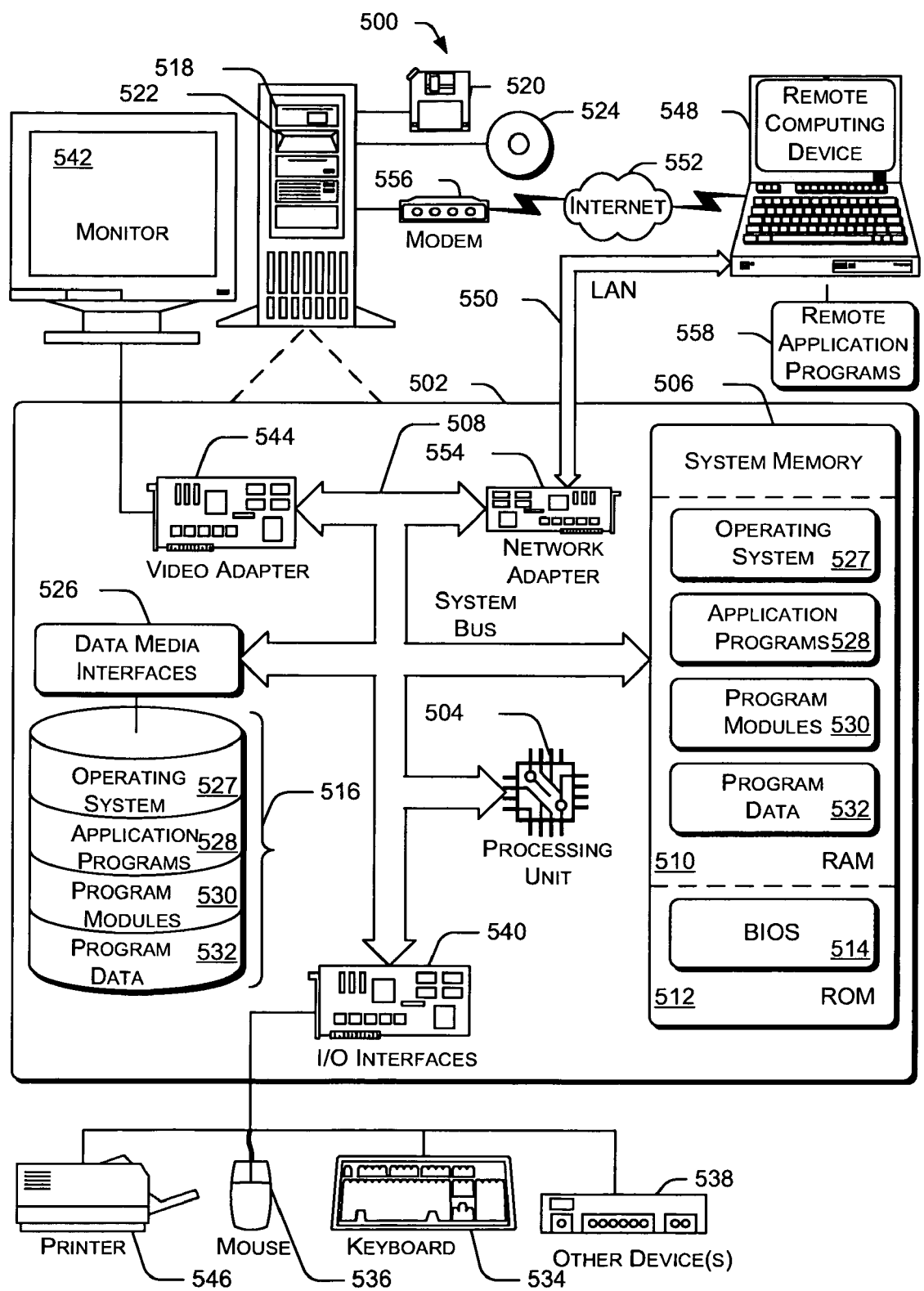
FIG. 5 is a block diagram illustrating an exemplary computing environment.

FIG. 5 illustrates an exemplary general computer environment 500, which can be used to implement the techniques described herein, and which may be representative, in whole or in part, of elements described herein. The computer environment 500 is only one example of a computing environment and is not intended to suggest any limitation as to the scope of use or functionality of the computer and network architectures. Neither should the computer environment 800 be interpreted as having any dependency or requirement relating to any one or combination of components illustrated in the example computer environment 500.

Computer environment 500 includes a general-purpose computing-based device in the form of a computer 502. Computer 502 can be, for example, a desktop computer, a handheld computer, a notebook or laptop computer, a server computer, a game console, and so on. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512 is illustrated. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown). Furthermore FIG. 5 illustrates a magnetic disk drive 518 for reading from and writing to a removable, non-volatile magnetic disk 520 (e.g., a "floppy disk"), additionally FIG. 5 illustrates an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternately, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more applications 528, other program modules 530, and program data 532. Each of such operating system 526, one or more applications 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546, which can be connected to computer 502 via the input/output interfaces 540.

Computer 502 can operate in a networked environment using logical connections to one or more remote computers, such as a remote computing-based device 548. By way of example, the remote computing-based device 548 can be a personal computer, portable computer, a server, a router, a network computer, a peer device or other common network node, and the like. The remote computing-based device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote applications 558 reside on a memory device of remote computer 548. For purposes of illustration, applications and other executable program components such as the operating system are illustrated herein as discrete blocks, although it is recognized that such programs and components reside at various times in different storage components of the computing-based device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing remote auto provisioning and publication of applications have been described in language specific to structural features and/or methods, it is to be understood that the subject of the appended claims is not necessarily limited to the specific features or methods described. Rather, the specific features and methods are disclosed as exemplary implementations for providing remote auto provisioning and publication of applications.

What is claimed is:

1. A system for an attribute identification framework comprising:
    a processing unit;
    an attribute identification algorithm module;
    an offline training portion comprising:
        a preprocessing module to tokenize a first sentence input to the offline training portion into ngrams to define a first tokenized sentence;
        a feature selection module employing information gain to determine a presence or absence of a plurality of attributes in the first tokenized sentence;
        a model training module to generate the attribute identification algorithm module for each of the plurality of attributes within the first tokenized sentence, with each term having a relationship with another term of the first tokenized sentence;
    an online prediction portion comprising:
        a preprocessing module to tokenize a second sentence input to the online prediction portion into ngrams to define a second tokenized sentence;
        an attribute prediction module to determine attributes of the second tokenized sentence employing the attribute identification algorithm module; and
        an attribute number prediction module to determine a number of attributes to be associated with the second tokenized sentence.

2. The system as recited in claim 1, wherein the first sentence comprises a plurality of attributes.

3. The system as recited in claim 1, wherein the second sentence comprises a plurality of attributes.

4. The system as recited in claim 1, wherein the second sentence is an online review for a product.

5. The system as recited in claim 1, wherein the attribute identification algorithm comprises a plurality of binary classifiers.

6. The system as recited in claim 1, wherein the ngrams are less than or equal to 3.

7. The system as recited in claim 1, wherein the information gain of the feature selection module is defined as:

$$G(t) = -\sum_{i=1}^{m} P_r(c_i) \log P_r(c_i) + P_r(t) \sum_{i=1}^{m} P_r(c_i \mid t) \log P_r(c_i \mid t) + P_r(t) \sum_{i=1}^{m} P_r(c_i \mid t) \log P_r(c_i \mid t)$$

wherein $c_i$ denotes a category of the attribute in the sentence.

* * * * *